US012700796B2

(12) United States Patent
Wang

(10) Patent No.: US 12,700,796 B2
(45) Date of Patent: Aug. 4, 2026

(54) POWER SUPPLY DEVICE COMPATIBLE WITH AC/DC INPUT AND CONTROL METHOD THEREOF

(71) Applicant: Delta Electronics (shanghai) Co., Ltd., Shanghai (CN)

(72) Inventor: Yuetian Wang, Hangzhou City (CN)

(73) Assignee: Delta Electronics (shanghai) Co., Ltd., Shanghai (CN)

( * ) Notice: Subject to any disclaimer, the term of this patent is extended or adjusted under 35 U.S.C. 154(b) by 172 days.

(21) Appl. No.: 18/456,100

(22) Filed: Aug. 25, 2023

(65) Prior Publication Data

US 2024/0072646 A1 Feb. 29, 2024

(30) Foreign Application Priority Data

Aug. 26, 2022 (CN) .......................... 202211034869.9

(51) Int. Cl.
H02M 1/42 (2007.01)
H02M 3/335 (2006.01)
(52) U.S. Cl.
CPC ......... H02M 1/42 (2013.01); H02M 3/33576 (2013.01)
(58) Field of Classification Search
CPC ............. H02M 1/0016; H02M 1/0022; H02M 1/0048; H02M 1/0051; H02M 1/0054; H02M 1/0067; H02M 1/007; H02M 1/0083; H02M 1/10; H02M 1/36; H02M 1/42–4291; H02M 3/00; H02M 3/22;
(Continued)

(56) References Cited

U.S. PATENT DOCUMENTS

| | | | |
|---|---|---|---|
| 5,663,635 A | 9/1997 | Vinciarelli et al. |
| 8,564,394 B2 | 10/2013 | Li et al. |

(Continued)

FOREIGN PATENT DOCUMENTS

| | | |
|---|---|---|
| CN | 101296599 A | 10/2008 |
| CN | 101399490 A | 4/2009 |

(Continued)

OTHER PUBLICATIONS

English translation of CN-113938019-A. (Year: 2022).*

(Continued)

*Primary Examiner* — Thienvu V Tran
*Assistant Examiner* — Carlos O Rivera-Perez
(74) *Attorney, Agent, or Firm* — CKC & Partners Co., LLC

(57) ABSTRACT

The present application provides a power supply device compatible with AC/DC input and a control method thereof, the device comprising a power factor correction circuit, a direct current-to-direct current (DC/DC) circuit, a bypass circuit, an input sampling circuit, and a controller. The power factor correction circuit is connected to the DC/DC circuit. The bypass circuit is connected to a boost circuit input end of the power factor correction circuit and an input end of the DC/DC circuit. The controller is connected to the input sampling circuit and the power factor correction circuit respectively, for controlling the power factor correction circuit to stabilize the output voltage within a preset range according to an input signal collected by the input sampling circuit, or turning off the power factor correction circuit and providing power for the DC/DC circuit via the bypass circuit.

12 Claims, 5 Drawing Sheets

(58) Field of Classification Search
CPC .................. H02M 3/24; H02M 3/315; H02M 3/335–33592; H02M 7/02; H02M 7/04; H02M 7/217; H02M 7/219; Y02B 70/10
USPC ................. 363/15–21.18, 37, 40–48, 65, 89, 363/123–127; 323/205–211, 222–226, 323/266, 271–275, 282–285, 351
See application file for complete search history.

(56) References Cited

U.S. PATENT DOCUMENTS

| | | | |
|---|---|---|---|
| 8,964,410 | B2 | 2/2015 | Chang et al. |
| 10,243,449 | B1 | 3/2019 | Young |
| 10,881,773 | B2 | 1/2021 | Rudser et al. |
| 10,931,206 | B2 | 2/2021 | Yamada |
| 12,200,867 | B2 | 1/2025 | Wang |
| 12,348,152 | B2 | 7/2025 | Wang |
| 2005/0083665 | A1 | 4/2005 | Nakashima et al. |
| 2005/0189566 | A1 | 9/2005 | Matsumoto et al. |
| 2006/0034109 | A1 | 2/2006 | Benabdelaziz et al. |
| 2007/0152795 | A1 | 7/2007 | Zeng et al. |
| 2008/0074204 | A1 | 3/2008 | Ichikawa et al. |
| 2008/0076484 | A1 | 3/2008 | Veselic |
| 2009/0045897 | A1 | 2/2009 | Yang et al. |
| 2009/0309684 | A1 | 12/2009 | Tsai et al. |
| 2010/0033282 | A1 | 2/2010 | Hsu et al. |
| 2010/0045590 | A1 | 2/2010 | Kumamoto et al. |
| 2011/0032683 | A1 | 2/2011 | Li et al. |
| 2011/0127833 | A1* | 6/2011 | Wu ......................... H02M 1/10 |
| | | | 307/31 |
| 2012/0099288 | A1 | 4/2012 | Parish |
| 2013/0188329 | A1 | 7/2013 | Chang et al. |
| 2014/0169042 | A1 | 6/2014 | Eguchi |
| 2015/0078042 | A1 | 3/2015 | Standing |
| 2018/0191263 | A1 | 7/2018 | Chida et al. |
| 2018/0197673 | A1 | 7/2018 | Njiende et al. |
| 2018/0205323 | A1 | 7/2018 | Cai et al. |
| 2019/0076587 | A1 | 3/2019 | Rudser et al. |
| 2019/0122806 | A1 | 4/2019 | Chou et al. |
| 2019/0140551 | A1 | 5/2019 | Lu et al. |
| 2019/0148061 | A1 | 5/2019 | Lu et al. |
| 2019/0378645 | A1 | 12/2019 | Chiang et al. |
| 2020/0153178 | A1 | 5/2020 | Zhang et al. |
| 2020/0320966 | A1 | 10/2020 | Clark et al. |
| 2021/0134520 | A1 | 5/2021 | Koki |
| 2021/0272737 | A1 | 9/2021 | Jin et al. |
| 2021/0305907 | A1 | 9/2021 | Dong et al. |
| 2021/0315112 | A1 | 10/2021 | Song et al. |
| 2022/0037074 | A1 | 2/2022 | Tashiro |
| 2023/0170819 | A1 | 6/2023 | Wang |
| 2023/0170820 | A1 | 6/2023 | Wang |
| 2023/0171892 | A1 | 6/2023 | Wang |
| 2024/0038441 | A1 | 2/2024 | Jiang et al. |
| 2024/0055985 | A1 | 2/2024 | Wang |

FOREIGN PATENT DOCUMENTS

| | | | | |
|---|---|---|---|---|
| CN | 102082495 | A | 6/2011 | |
| CN | 102881405 | A | 1/2013 | |
| CN | 103368371 | A | 10/2013 | |
| CN | 103516193 | A | 1/2014 | |
| CN | 103973097 | A | 8/2014 | |
| CN | 104749426 | A | 7/2015 | |
| CN | 105099131 | A | 11/2015 | |
| CN | 105099160 | A | 11/2015 | |
| CN | 105281570 | A | 1/2016 | |
| CN | 206388585 | U | 8/2017 | |
| CN | 107147094 | A | 9/2017 | |
| CN | 107210681 | A | 9/2017 | |
| CN | 207459970 | U | 6/2018 | |
| CN | 207612194 | U | 7/2018 | |
| CN | 108667337 | A | 10/2018 | |
| CN | 109787484 | A | 5/2019 | |
| CN | 209516901 | U | 10/2019 | |
| CN | 112104201 | A | 12/2020 | |
| CN | 212659384 | U | 3/2021 | |
| CN | 212936301 | U | 4/2021 | |
| CN | 213305278 | U | 5/2021 | |
| CN | 214101195 | U | 8/2021 | |
| CN | 113452271 | A | 9/2021 | |
| CN | 214154343 | U | 9/2021 | |
| CN | 214626409 | U | 11/2021 | |
| CN | 113938019 | A * | 1/2022 | ............. H02M 1/44 |
| EP | 1626493 | A1 | 2/2006 | |
| JP | 2011-087367 | A | 4/2011 | |
| WO | 2008/149530 | A1 | 12/2008 | |
| WO | 2015106643 | A1 | 7/2015 | |

OTHER PUBLICATIONS

Mingyang et al., "Method for Realizing DC Output of Wind Turbine Based on Diode Rectifier", High Voltage Engineering, vol. 47, No. 8, Aug. 31, 2021, 13 pages.

Galkin, et al., "Selection of Power Factor Corrector for Modular Uninterruptable Power Supply System," 14th International Power Electronics and Motion Control Conference, EPE-PEMC 2010, 5 pages (2010).

The Office Action of corresponding Chinese application No. 202211034869.9, dated Jul. 4, 2025.

Wei Xuezhe et al., Principle and Design of Wireless Charging System for Electric Vehicles, Tongji University Press, published on Mar. 31, 2021, pp. 170-174.

* cited by examiner

POWER SUPPLY DEVICE COMPATIBLE WITH AC/DC INPUT AND CONTROL METHOD THEREOF

RELATED APPLICATION

This application claims priority under 35 U.S.C. § 119 or 365 to China Application No. 202211034869.9, filed Aug. 26, 2022. The entire teachings of the above application are incorporated herein by reference.

TECHNICAL FIELD

The present application relates to the field of server power supply, and in particular to a power supply device compatible with AC/DC input and a control method thereof.

BACKGROUND

At present, the current circuit topology of the server power supply generally includes a front-stage power factor correction circuit and a post-stage isolated direct current-to-direct current (DC/DC) circuit, wherein the front-stage power factor correction circuit is to control the input current to achieve the power factor close to 1 under alternating current (AC) input conditions; in addition, the server power supply basically needs to operate under both AC and DC input conditions, and does not need power factor correction under the DC input condition, at this time, the front-stage power factor correction circuit is to stabilize its output voltage in a certain range, and as the input of the post-stage isolated DC/DC circuit.

The voltage of AC power grid is different greatly in different countries and regions, and the front-stage power factor correction circuit can realize power factor correction and stabilize the output voltage as well. At this time, the stable output voltage is greater than the peak value of the maximum input AC voltage, so that the output voltage can be stabilized in the fixed voltage range under all AC power network voltage inputs. In the current server power supply system, the DC input voltage is lower than the peak value of the maximum input AC voltage. In order to optimize the design of the post-stage isolated DC/DC, when the input is DC, it is necessary to boost the input DC voltage to the same output voltage range as when the input is AC, and in this case, the front-stage power factor correction circuit is for boosting.

SUMMARY

An object of the present application is to provide a power supply device compatible with AC/DC input and a control method thereof, to improve the efficiency of the entire power supply system.

To achieve the above object, the power supply device compatible with AC/DC input provided by the present application comprises a power factor correction circuit, a direct current-to-direct current (DC/DC) circuit, a bypass circuit, an input sampling circuit, and a controller. The power factor correction circuit is connected to the DC/DC circuit. The bypass circuit is connected to a boost circuit input end of the power factor correction circuit and an input end of the DC/DC circuit. The controller is connected to the input sampling circuit and the power factor correction circuit respectively, for controlling the power factor correction circuit to stabilize the output voltage within a preset range according to an input signal collected by the input sampling circuit, or turning off the power factor correction circuit and providing power for the DC/DC circuit via the bypass circuit.

In some embodiments of the present application, the bypass circuit includes a low conduction voltage drop component.

In some embodiments of the present application, the power factor correction circuit is a boost-type bridged power factor correction circuit. The boost-type bridged power factor correction circuit comprises an uncontrolled rectifier bridge and a boost circuit. The boost circuit is a single-phase boost circuit, a two-phase boost circuit or a multi-phase interleaved boost circuit.

In some embodiments of the present application, the low conduction voltage drop component is connected to an input end of an inductor of the boost circuit and an output positive end of the boost circuit, respectively.

In some embodiments of the present application, when the voltage polarity of the DC input of the power supply device compatible with AC/DC input is unchanged, the low conduction voltage drop component is connected to a positive input end of the rectifier bridge and the output positive end of the boost circuit, respectively.

In some embodiments of the present application, when the voltage polarity of the DC input of the power supply device compatible with AC/DC input is changed, the low conduction voltage drop component comprises a first conduction unit and a second conduction unit. The first conduction unit is connected to the input positive end of the rectifier bridge and the output positive end of the boost circuit, respectively. The second conduction unit is connected to an input negative end of the rectifier bridge and the output positive end of the boost circuit, respectively.

In some embodiments of the present application, the power factor correction circuit is a boost-type bridgeless power factor correction circuit. The boost-type bridgeless power factor correction circuit comprises a first switch, a second switch, a third switch and a fourth switch. The first switch is disposed between an inductor and positive ends of a capacitor of the boost circuit, and the second switch is disposed between the inductor and negative ends of the capacitor of the boost circuit. The third switch is disposed between a negative end of the AC/DC input and the positive end of the capacitor, and the fourth switch is disposed between the negative end of the AC/DC input and the negative end of the capacitor.

In some embodiments of the present application, the boost-type bridgeless power factor correction circuit further comprises a fifth switch. The fifth switch is connected to an output end of an inductor of the boost circuit and a negative end of the AC/DC input, respectively.

In some embodiments of the present application, when the voltage polarity of the DC input of the power supply device compatible with AC/DC input is unchanged, the low conduction voltage drop component is connected to an input end of an inductor of the boost circuit and an output positive end of the switching DC boost circuit, respectively.

In some embodiments of the present application, when the voltage polarity of the DC input of the power supply device compatible with AC/DC input is changed, the low conduction voltage drop component comprises a first conduction unit and a second conduction unit. The first conduction unit is connected to an input end of an inductor of the boost circuit and an output positive end of the boost circuit, respectively. The second conduction unit is connected to an input end of an inductor of the boost circuit and an output negative end of the boost circuit, respectively.

The present application further provides a control method suitable for the power supply device compatible with AC/DC input. The method comprises: when the peak value of the input AC voltage is less than the input DC voltage and the range of the input DC voltage is within a preset threshold value, analyzing type of an input via an input sampling circuit; when the type of the input is an AC input, controlling, a power factor correction circuit to perform power factor correction function by a controller, and stabilizing an output voltage of the power factor correction circuit within a preset threshold value; when the type of the input is a DC input, turning off the power factor correction circuit by the controller and providing power to a DC/DC circuit by a bypass circuit.

For the whole server power supply system, when the DC input voltage is higher, it is helpful for the efficiency of the whole system, and the DC input voltage will be further increased in the future. The output voltage of the front-stage power factor correction circuit may be stabilized around the voltage of the DC input when the DC input voltage is increased above the peak of the maximum input voltage. The power factor correction circuit implements power factor correction and boosting functions when input is AC. When input is DC, the power factor correction circuit can be disabled, and the power loss of the power factor correction circuit can be saved to further improve efficiency by supplying power to the post-stage isolated direct current-to-direct current (DC/DC) through a bypass circuit.

In order to make the above and other objects, features, and advantages of the present application be more obvious and easier to understand, hereinafter detailed description is given by combining preferred embodiments in conjunction with the accompanying drawings.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

To illustrate more clearly the embodiments of the present application or the technical schemes of the prior art, a brief description of the accompanying drawings in the embodiments or the prior art will be given below. Obviously, the accompanying drawings described below are only some embodiments described in this application. For those of ordinary skill in the art, other drawings can also be obtained without any creative labor from these drawings.

DETAILED DESCRIPTION

A description of example embodiments follows.

Hereinafter the technical solution in the embodiments of the present application will be described clearly and integrally in combination with the accompanying drawings in the embodiments of the present application, and obviously the described embodiments are merely part of the embodiments, not all of the embodiments. Any other embodiment obtained by those skilled in the art based on the embodiments of the present application without paying any creative labor fall within the protection scope of the present application.

With reference to the Description and drawings below, a specific embodiment of the present application is disclosed in detail, which specifies the manner in which the principle of the present application can be adopted. It should be understood that, the scope of the embodiment of the present application is not limited. Within the scope of the spirit and clause of the appended claims, the embodiment of the present application includes many variations, modifications and equivalents.

The features described and/or shown for one embodiment can be used in one or more other embodiments in the same or similar manner, can be combined with the features in other embodiments or replace the features in other embodiments.

It should be emphasized that, the term "include/contain" refers to, when being used in the text, existence of features, parts, steps or assemblies, without exclusion of existence or attachment of one or more other features, parts, steps or assemblies.

Figure 1:
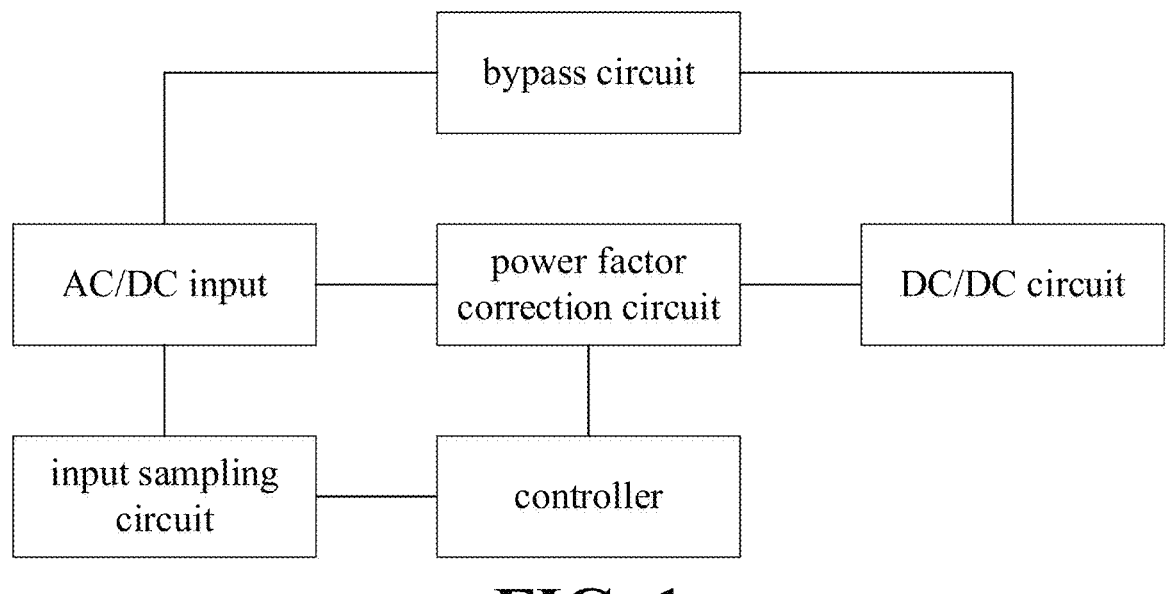
FIG. 1 is a schematic diagram of a logic structure of a power supply device compatible with AC/DC input provided in an embodiment of the present application.

As shown in FIG. 1, the power supply device compatible with AC/DC input provided by the present application comprises a power factor correction circuit, a direct current-to-direct current (DC/DC) circuit, a bypass circuit, an input sampling circuit, and a controller. The power factor correction circuit is connected to the DC/DC circuit. The bypass circuit is connected to a boost circuit input end of the power factor correction circuit and an input end of the DC/DC circuit. The controller is connected to the input sampling circuit and the power factor correction circuit respectively, for controlling the power factor correction circuit to stabilize the output voltage within a preset range according to an input signal collected by the input sampling circuit, or turning off the power factor correction circuit and providing power for the DC/DC circuit via the bypass circuit.

In the above embodiment, the AC/DC input is connected to the power factor correction circuit and the bypass circuit, the DC/DC circuit is connected to the bypass circuit and the power factor correction circuit respectively, and the input sampling circuit is connected to the AC/DC input and the controller respectively. When the voltage Uin2 of the DC of the AC/DC input is greater than the maximum peak value Uin1 of the input AC, and Uin2 is within a preset range, such as +/−5% of a fixed value, in the present application, the power loss of the power factor correction circuit is saved by adding a bypass circuit, so as to further improve the efficiency. Specifically, for the whole server power supply system, when the DC input voltage is higher, it is helpful for the efficiency of the whole system, and the DC input voltage will be further increased in the future. The output voltage of the front-stage power factor correction circuit may be stabilized around the voltage of the DC input when the DC input voltage is increased above the peak of the maximum input voltage. The power factor correction circuit implements power factor correction and boosting functions when input is AC. When input is DC, the power factor correction circuit can be disabled, and the power loss of the power factor correction circuit can be saved to further improve efficiency by supplying power to the post-stage isolated DC/DC through a bypass circuit. The bypass circuit comprises a low conduction voltage drop component which comprises or may be a diode and/or an MOS. The low conduction voltage drop component can be selected and arranged by a person skilled in the art according to actual needs, and no further definition is made in the present application.

Figure 2:
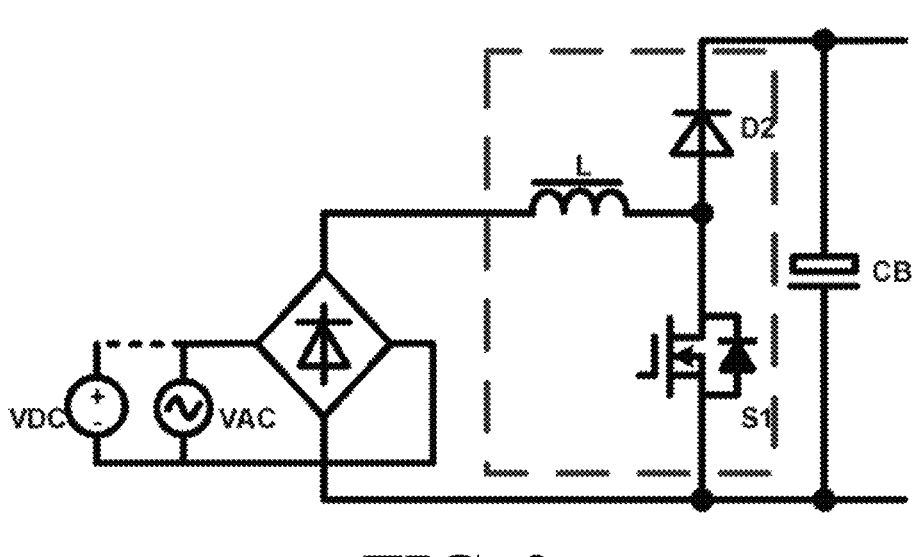
FIG. 2 is a structural schematic diagram of a boost-type bridged power factor correction circuit provided in an embodiment of the present application.

In some embodiments of the present application, the power factor correction circuit is a boost-type bridged power factor correction circuit. The boost-type bridged power factor correction circuit comprises an uncontrolled rectifier bridge and a boost circuit, which may be a single-phase boost circuit, a two-phase boost circuit or a multi-phase interleaved boost circuit. Specifically, as shown in FIG. 2, the AC/DC input are connected to the inductor L and the switch of the boost circuit after passing through the rectifier bridge, the inductor L and the switch are connected to a diode, and the diode and the rectifier bridge are respectively connected to the positive and negative ends of the capacitor, wherein the switch of the boost circuit may be an MOS; wherein, the components of boost circuit shown in the frame can be selected based on actual application, and no specific limitation is made in the present application.

Figure 3:
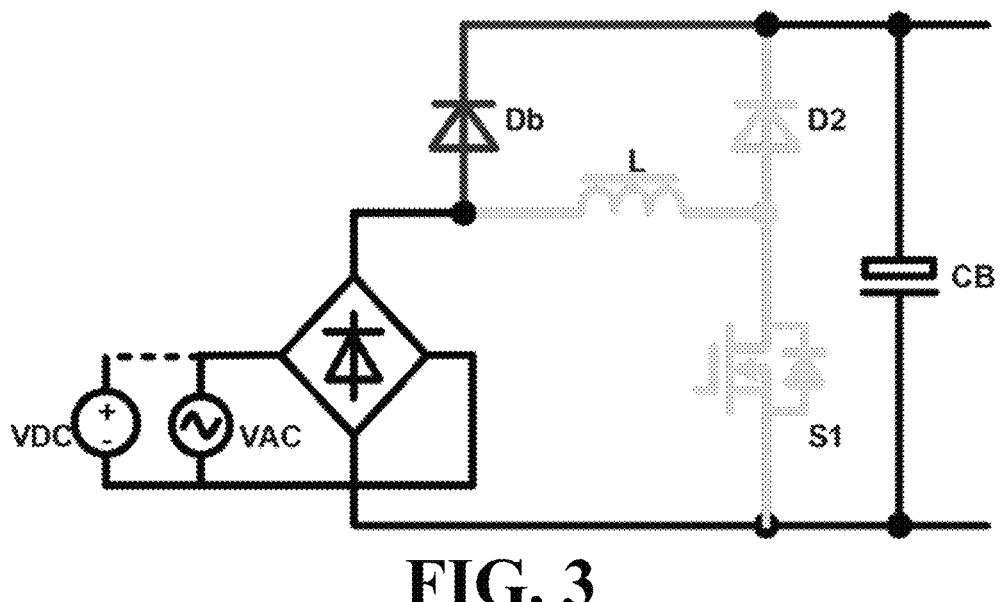
FIG. 3 is a schematic diagram of a connection structure of a bypass circuit on a bridged power factor correction circuit provided in an embodiment of the present application.

Referring to FIG. 3, in some embodiments of the present application, the low conduction voltage drop component is connected to an input end of an inductor of the boost circuit and an output positive end of the boost circuit, respectively. Specifically, in this embodiment, the bypass circuit is mainly used to bypass the boost circuit to reduce the power loss caused by the boost circuit, wherein the low conduction voltage drop component may be a diode Db to connect the output positive end of the uncontrolled rectifier bridge to the positive end of the capacitor CB. In the boost circuit, the element inductor L, and D2 and S1 are bypassed to reduce power loss. In the structure of FIG. 3, a bypass circuit with a diode Db is provided compared with that of FIG. 2, and the other structures are the same as those of FIG. 2 and will not be described in detail.

Figure 4:
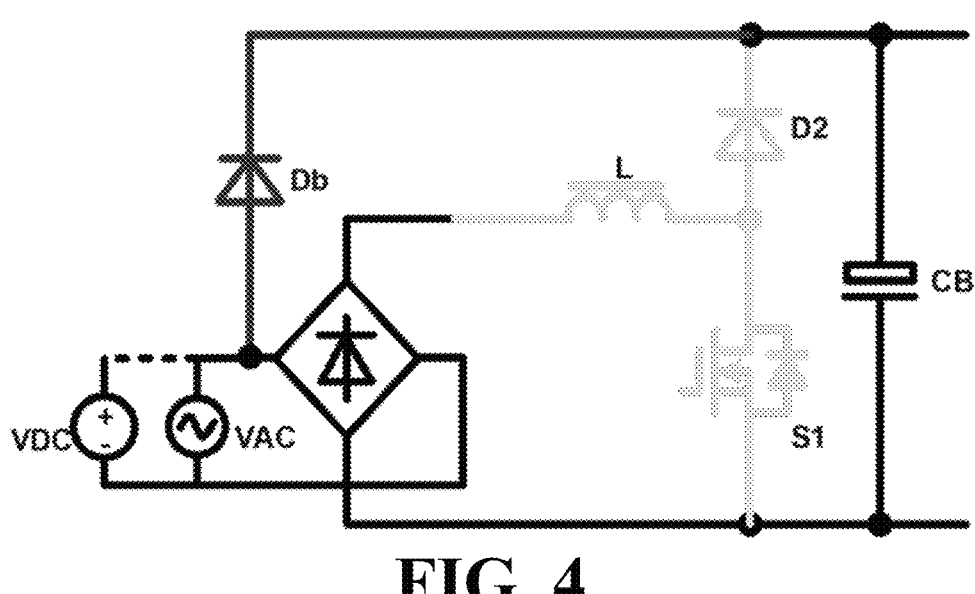
FIG. 4 is a schematic diagram of a connection structure of a bypass circuit on a bridged power factor correction circuit provided in an embodiment of the present application.

Referring to FIG. 4, in some embodiments of the present application, when the voltage polarity of the DC input of the power supply device compatible with AC/DC input is unchanged, the low conduction voltage drop component is connected to a positive input end of the rectifier bridge and the output positive end of the boost circuit, respectively. Specifically, compared with FIG. 3, the position of the bypass circuit is changed in FIG. 4. When the voltage polarity of the DC input of front-stage circuit is unchanged, the diode Db in the bypass circuit may be connected to the positive input end before the rectifier bridge and the positive end of the boost circuit output. This circuit can further save the power loss caused by the bridge arm on the rectifier bridge.

Figure 5:
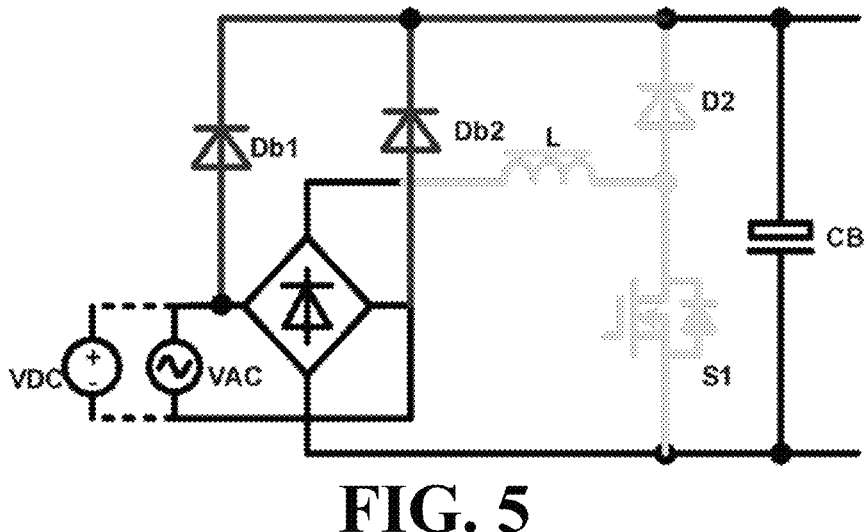
FIG. 5 is a schematic diagram of a connection structure of a bypass circuit on a bridged power factor correction circuit provided in an embodiment of the present application.

Referring to FIG. 5, in some embodiments of the present application, when the voltage polarity of the DC input of the power supply device compatible with AC/DC input is changed, the low conduction voltage drop component comprises a first conduction unit and a second conduction unit. The first conduction unit is connected to the input positive end of the rectifier bridge and the output positive end of the boost circuit, respectively. The second conduction unit is connected to an input negative end of the rectifier bridge and the output positive end of the boost circuit, respectively. Specifically, compared with FIG. 4, the connection mode of the bypass circuit is further adjusted in FIG. 5. When voltage polarity of the DC input of front-stage circuit is changed, the bypass circuit may be provided with a first conduction unit Db1 and a second conduction unit Db2, which are connected to the positive input end, the negative input end before the rectifier bridge and the positive end of the output voltage respectively, so as to further save the diode loss of the upper bridge arm or the lower bridge arm of the rectifier bridge, as well as the power loss brought by the element inductor L, the low conduction voltage drop component D2 and the insulated gate bipolar transistor S1 in the boost circuit.

Figure 6:
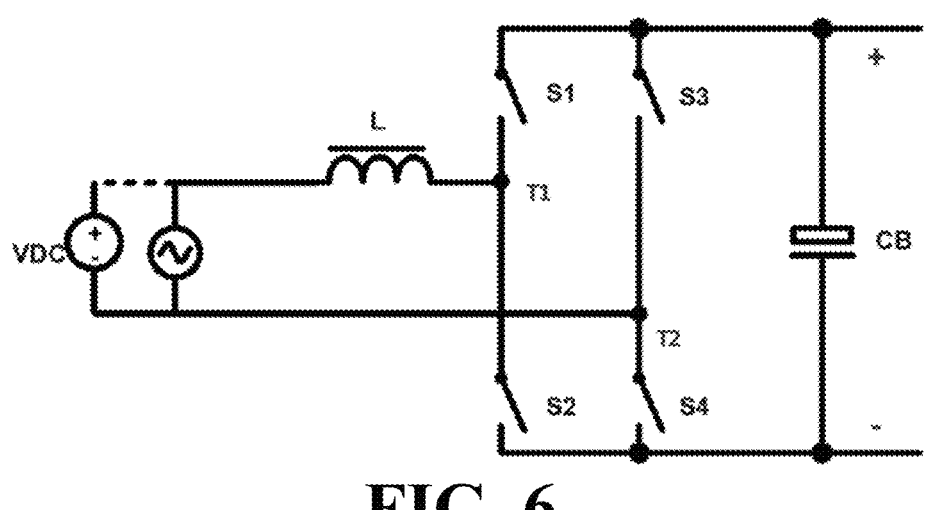
FIG. 6 is a structural schematic diagram of a boost-type bridgeless power factor correction circuit provided in an embodiment of the present application.

In some embodiments of the present application, the power factor correction circuit is a boost-type bridgeless power factor correction circuit. The boost-type bridgeless power factor correction circuit comprises a first switch, a second switch, a third switch and a fourth switch. The first switching tube is disposed between an inductor and positive ends of a capacitor of the boost circuit, and the second switch is disposed between the inductor and negative ends of the capacitor of the boost circuit. The third switch is disposed between a negative end of the AC/DC input and the positive end of the capacitor, and the fourth switch is disposed between the negative end of the AC/DC input and the negative end of the capacitor. Specifically referring to FIG. 6, the bridgeless power factor correction circuit comprises at least four switch S1, S2, S3 and S4. S1 is arranged between the output end of the inductor L and the positive end of the capacitor CB, S2 is arranged between the output end of the inductor L and the negative end of the capacitor CB, S3 is arranged between the negative end of the AC/DC input (VDC and VAC), that is, the other end connected to the inductor L, and the positive end of the capacitor CB, and S4 is arranged between the negative end of the AC/DC input (VDC and VAC), and the negative end of the capacitor CB; wherein S1 can be conducted at least from T1 to +bulk (positive pole of capacitor CB), S2 can be conducted at least from −bulk (negative pole of capacitor CB) to T1, S3 can be conducted at least from T2 to +bulk, and S4 can be conducted at least from −bulk to T2.

Figure 7:
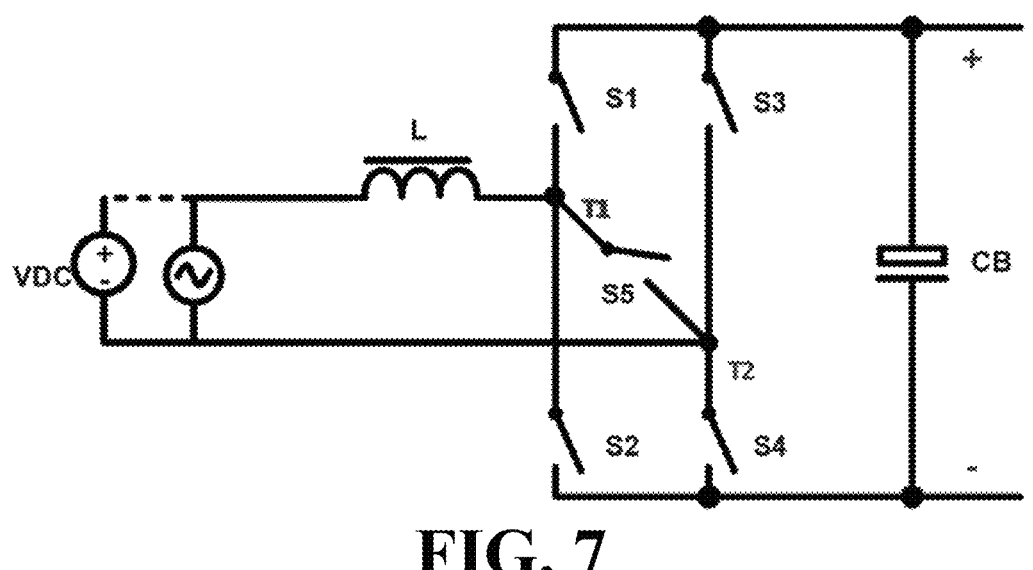
FIG. 7 is a structural schematic diagram of a boost-type bridgeless power factor correction circuit provided in an embodiment of the present application.

Further, referring to FIG. 7, in some embodiments of the present application, the boost-type bridgeless power factor correction circuit further comprises a fifth switch. The fifth switch is connected to an output end of an inductor of the boost circuit and a negative end of the AC/DC input, respectively. This embodiment shows another boost-type bridgeless power factor correction circuit, which differs from FIG. 6 in that, in addition to an inductor L, a switch S5 is arranged between two ends of the AC/DC input, and the other structures are consistent with FIG. 6, which will not be further described herein.

Figure 8:
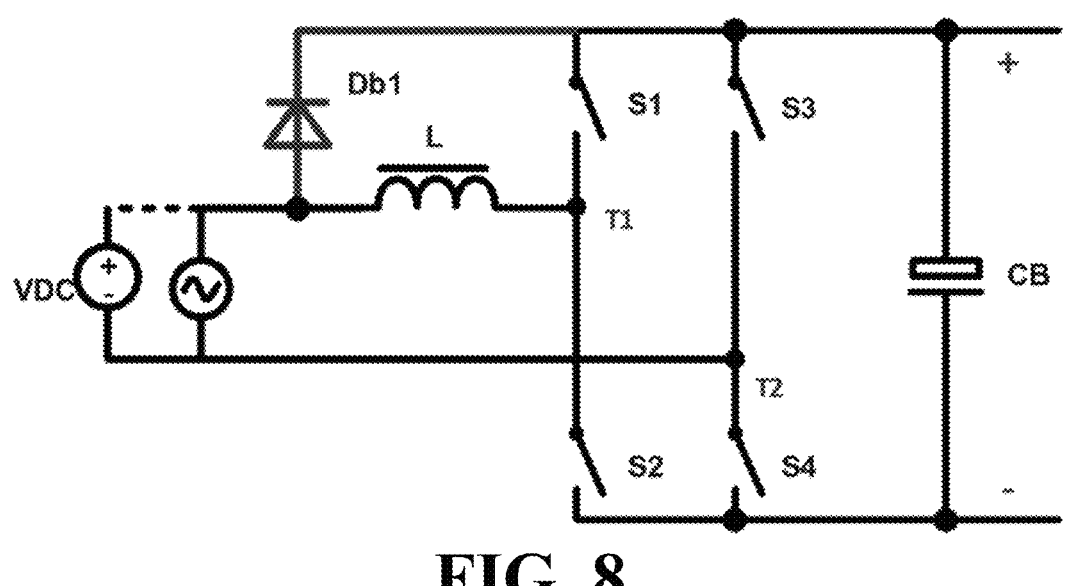
FIG. 8 is a schematic diagram of a connection structure of a bypass circuit on a bridgeless power factor correction circuit provided in an embodiment of the present application.
Figure 9:
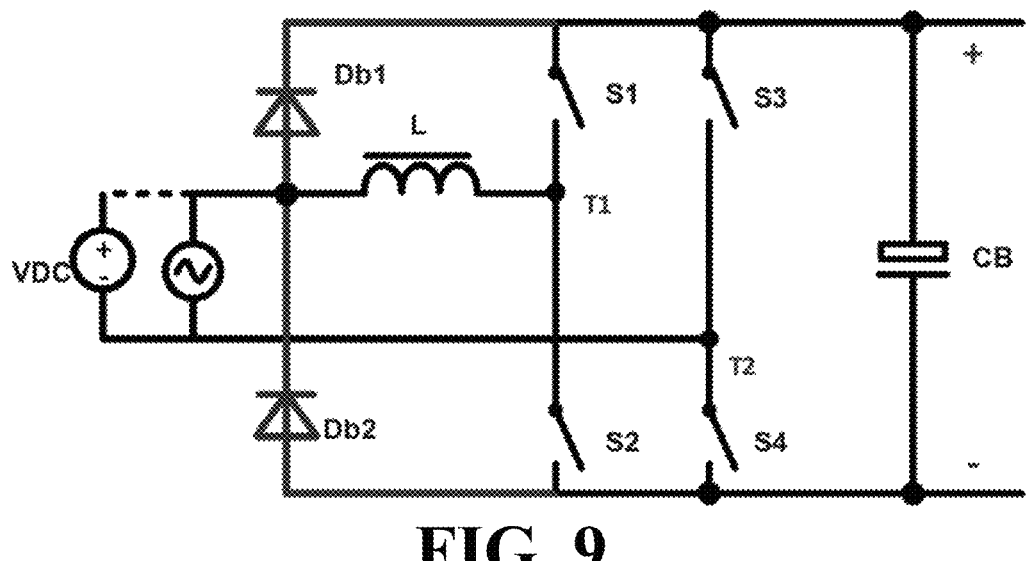
FIG. 9 is a schematic diagram of a connection structure of a bypass circuit on a bridgeless power factor correction circuit provided in an embodiment of the present application.

On the basis of a boost-type bridgeless power factor correction circuit, in some embodiments of the present application, when the voltage polarity of the DC input of the power supply device compatible with AC/DC input is unchanged, the low conduction voltage drop component is connected to an input end of an inductor of the boost circuit and an output positive end of the boost circuit, respectively. Specifically referring to FIG. 8, compared with FIG. 6, the power loss caused by the inductor L is effectively avoided by adding a bypass circuit in this structure, the bypass circuit is provided with a conduction unit, which may be a diode or an MOS transistor, wherein one end of the bypass circuit is connected to the input end of the inductor L, and the other end thereof is connected to the positive end of the capacitor CB. In another embodiment, when the voltage polarity of the DC input of the power supply device compatible with AC/DC input is changed, the low conduction voltage drop component comprises a first conduction unit and a second conduction unit. The first conduction unit is connected to an input end of an inductor of the boost circuit and an output positive end of the boost circuit, respectively, and the second conduction unit is connected to an input end of an inductor of the boost circuit and an output negative end of the boost circuit, respectively, wherein the conduction unit may be a diode or an MOS transistor. Specifically referring to FIG. 9, when the voltage polarity of the DC input of front-stage circuit is not fixed, the bypass circuit may be provided with a first conduction unit Db1 and a second conduction unit Db2, which are respectively connected at the input end of the inductor to the positive end and the negative end of the output voltage. The structure is similar to that of FIG. 8, but with the addition of another bypass circuit constructed by the second conduction unit, whereby the losses of the inductor L and the switch S1, S2 are effectively avoided.

The present application further provides a control method suitable for the power supply device compatible with AC/DC input, the method comprising:

when the peak value of the input AC voltage is less than the input DC voltage and the range of the input DC voltage is within a preset threshold value, analyzing type of an input via an input sampling circuit;

when the type of the input is an AC input, controlling, a power factor correction circuit to perform power factor correction function by a controller, and stabilizing an output voltage of the power factor correction circuit within a preset threshold value;

when the type of the input is a DC input, turning off the power factor correction circuit by the controller and providing power to a DC/DC circuit by a bypass circuit.

In practical work, for the whole server power supply system, when the DC input voltage is higher, it is helpful for the efficiency of the whole system, and the DC input voltage will be further increased in the future. The output voltage of the front-stage power factor correction circuit may be stabilized around the voltage of the DC input when the DC input voltage is increased above the peak of the maximum input voltage. The power factor correction circuit implements power factor correction and boosting functions when input is AC. When input is DC, the power factor correction circuit can be disabled, and the power loss of the power factor correction circuit can be saved to further improve efficiency by supplying power to the post-stage isolated DC/DC through a bypass circuit.

It should also be noted that in this specification, relational terms such as first and second and the like are only used to distinguish one entity or operation from another entity or operation, and the existence of any such actual relationship or order between these entities or operations is not necessarily required or implied. Moreover, the term "comprise", "include" or any other variant intends to cover the non-exclusive inclusions, so that a process, a method, a commodity or a device comprising a series of elements comprise not only those elements, but also other elements not explicitly listed, or further comprise inherent elements of such process, method, commodity or device. An element that is defined by the phrase "comprising a . . . " does not exclude the presence of additional elements in the process, method, product, or equipment that comprises the element. The terms "upper", "lower" and the like indicate an orientation or position relationship based on the orientation or position relationship shown in the drawings, merely for convenience of description and simplification of the present application, but do not indicate or imply that the device or element referred to must have a particular orientation, be constructed and operated in a specific orientation, and therefore should not be construed as limiting the present application. The terms "installed", "connected to", "connected" are to be understood in a broad sense unless expressly specified and defined otherwise. For example, the connection may be a fixed connection, a detachable connection or an integrated connection, or may be a mechanical connection or an electrical connection, or may be a direct connection, or may be an indirect connection through an intermediary, or an internal communication between two elements. The specific meanings of the above terms in the present application may be understood by those ordinarily skilled in the art as the case may be.

The various embodiments in the specification are described in a progressive manner, and the same or similar parts between the various embodiments may be referred to each other, and each embodiment focuses on the differences from the other embodiments. In the description, reference terms "one embodiment", "some embodiments", "example", "specific example" or "some examples" are used to mean that specific features, structures, materials or characteristics described by combining the embodiment or example are included in at least one embodiment or example in the embodiments of the present specification. In the present specification, exemplary expression of the above terms does not necessarily refer to the same embodiment or example. Moreover, the described specific features, structures, materials or characteristics may be combined in a suitable manner in any one or more of the embodiments or examples. Furthermore, those skilled in the art can combine different embodiments or examples described in the present specification and features of the different embodiments or examples in the case that they are not contradictory to each other.

The present application adopts specific embodiments to explain the principle and implementation way of the present application. The above embodiments are described merely for helping to understand the method and core concept of the present application; in addition, a person skilled in the art can, on the basis of the concept of the present application, make modifications to both of the specific embodiments and application scope. In conclusion, contents disclosed herein should not be understood as limitation to the present application.

While example embodiments have been particularly shown and described, it will be understood by those skilled in the art that various changes in form and details may be made therein without departing from the scope of the embodiments encompassed by the appended claims.

What is claimed is:

1. A power supply device compatible with an alternating current (AC)/direct current (DC) input, characterized in comprising a power factor correction circuit, a direct current-to-direct current (DC/DC) circuit, a bypass circuit, an input sampling circuit, and a controller;

the power factor correction circuit is connected to the DC/DC circuit;

the bypass circuit is connected to a boost circuit input end of the power factor correction circuit and an input end of the DC/DC circuit;

the controller is connected to the input sampling circuit and the power factor correction circuit respectively;

wherein the input sampling circuit is configured to collect an input signal and analyze a type of the input signal;

when a peak value of an input AC voltage is less than an input DC voltage and a range of the input DC voltage is within a first preset range, the controller is configured to:

when the type of the input signal is an AC input, control the power factor correction circuit to perform a power factor correction function and stabilize an output voltage within a second preset range; and when the type of the input signal is a DC input, turn off the power factor correction circuit and control the bypass circuit to provide power to the DC/DC circuit.

2. The power supply device compatible with AC/DC input according to claim 1, characterized in that, the bypass circuit comprises a low conduction voltage drop component.

3. The power supply device compatible with AC/DC input according to claim 2, characterized in that, the power factor correction circuit is a boost-type bridged power factor correction circuit, the boost-type bridged power factor correction circuit comprises an uncontrolled rectifier bridge and a boost circuit, and the boost circuit is a single-phase boost circuit, a two-phase boost circuit or a multi-phase interleaved boost circuit.

4. The power supply device compatible with AC/DC input according to claim 3, characterized in that, when a voltage polarity of the DC input of the power supply device compatible with AC/DC input is changed, the low conduction voltage drop component comprises a first conduction unit and a second conduction unit, the first conduction unit is connected to an input positive end of the uncontrolled rectifier bridge and an output positive end of the boost circuit, respectively, and the second conduction unit is connected to an input negative end of the rectifier bridge and the output positive end of the boost circuit, respectively.

5. The power supply device compatible with AC/DC input according to claim 1, characterized in that, the power factor correction circuit is a boost-type bridgeless power factor correction circuit, the boost-type bridgeless power factor correction circuit comprises a boost circuit, a first switch, a second switch, a third switch and a fourth switch;

the first switch is disposed between an inductor and a positive end of a capacitor of the boost circuit, and the second switch is disposed between the inductor and a negative end of the capacitor of the boost circuit;

the third switch is disposed between a negative end of the AC/DC input and the positive end of the capacitor, and the fourth switch is disposed between the negative end of the AC/DC input and the negative end of the capacitor.

6. The power supply device compatible with AC/DC input according to claim 5, characterized in that, the bypass circuit comprises a low conduction voltage drop component, and when a voltage polarity of the DC input of the power supply device compatible with AC/DC input is changed, the low conduction voltage drop component comprises a first conduction unit and a second conduction unit, the first conduction unit is connected to an input end of the inductor of the boost circuit and an output positive end of the boost circuit, respectively, and the second conduction unit is connected to the input end of the inductor of the boost circuit and an output negative end of the boost circuit, respectively.

7. A control method suitable for the power supply device compatible with AC/DC input according to claim 1, characterized in that, the method comprises:

collecting the input signal and analyzing the type of the input signal via the input sampling circuit, and when the peak value of the input AC voltage is less than the input DC voltage and the range of the input DC voltage is within the first preset range, performing the following operations by the controller:

when the type of the input signal is an AC input, controlling the power factor correction circuit to perform the power factor correction function, and stabilizing the output voltage of the power factor correction circuit within the second preset range; and when the type of the input signal is a DC input, turning off the power factor correction circuit and controlling the bypass circuit to provide power to the DC/DC circuit.

8. The control method suitable for the power supply device compatible with AC/DC input according to claim 7, characterized in that, the bypass circuit comprises a low conduction voltage drop component.

9. The control method suitable for the power supply device compatible with AC/DC input according to claim 8, characterized in that, the power factor correction circuit is a boost-type bridged power factor correction circuit, the boost-type bridged power factor correction circuit comprises an uncontrolled rectifier bridge and a boost circuit, and the boost circuit is a single-phase boost circuit, a two-phase boost circuit or a multi-phase interleaved boost circuit.

10. The control method suitable for the power supply device compatible with AC/DC input according to claim 9, characterized in that, when a voltage polarity of the DC input of the power supply device compatible with AC/DC input is changed, the low conduction voltage drop component comprises a first conduction unit and a second conduction unit, the first conduction unit is connected to an input positive end of the uncontrolled rectifier bridge and an output positive end of the boost circuit, respectively, and the second conduction unit is connected to an input negative end of the rectifier bridge and the output positive end of the boost circuit, respectively.

11. The control method suitable for the power supply device compatible with AC/DC input according to claim 7, characterized in that, the power factor correction circuit is a boost-type bridgeless power factor correction circuit, the boost-type bridgeless power factor correction circuit comprises a boost circuit, a first switch, a second switch, a third switch and a fourth switch;

the first switch is disposed between an inductor and a positive end of a capacitor of the boost circuit, and the second switch is disposed between the inductor and a negative end of the capacitor of the boost circuit;

the third switch is disposed between a negative end of the AC/DC input and the positive end of the capacitor, and the fourth switch is disposed between the negative end of the AC/DC input and the negative end of the capacitor.

12. The control method suitable for the power supply device compatible with AC/DC input according to claim 11, characterized in that, the bypass circuit comprises a low conduction voltage drop component, and when a voltage polarity of the DC input of the power supply device compatible with AC/DC input is changed, the low conduction voltage drop component comprises a first conduction unit and a second conduction unit, the first conduction unit is connected to an input end of the inductor of the boost circuit and an output positive end of the boost circuit, respectively, and the second conduction unit is connected to the input end of the inductor of the boost circuit and an output negative end of the boost circuit, respectively.

\* \* \* \* \*